(12) United States Patent
Hanaoka et al.

(10) Patent No.: US 6,257,783 B1
(45) Date of Patent: Jul. 10, 2001

(54) PRINTER AND CONTROL METHOD FOR THE SAME

(75) Inventors: Yukihiro Hanaoka; Takeshi Endo, both of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/538,753

(22) Filed: Mar. 30, 2000

(30) Foreign Application Priority Data

Mar. 30, 1999 (JP) .................................................. 11-090022

(51) Int. Cl.[7] .................................................. B41J 13/00
(52) U.S. Cl. ............................ 400/578; 400/188; 400/582
(58) Field of Search ............................. 400/61, 578, 582, 400/188; 271/225

(56) References Cited

U.S. PATENT DOCUMENTS

| | | | |
|---|---|---|---|
| 4,944,505 | * | 7/1990 | Sherman III .......................... 271/265 |
| 5,415,391 | * | 5/1995 | Wong et al. .......................... 271/225 |
| 5,865,547 | | 2/1999 | Harris et al. .......................... 400/578 |
| 6,103,985 | * | 8/2000 | Shell et al. ............................ 209/587 |

FOREIGN PATENT DOCUMENTS

| | | |
|---|---|---|
| 05170372 | 7/1993 | (JP) . |
| 06171158 | 6/1994 | (JP) . |
| 08175766 | 7/1996 | (JP) . |

* cited by examiner

*Primary Examiner*—John S. Hilten
*Assistant Examiner*—Charles H. Nolan, Jr.
(74) *Attorney, Agent, or Firm*—Nixon & Vanderhye P.C.

(57) ABSTRACT

A compact printer efficiently performs a sequence of processes to front and back sides of a print medium, typically a personal check. The printer has a transportation path for transporting a check P from the insertion opening thereof to the ejection opening by drive rollers, moving the check P through the transportation path. An image scanner captures an image of the print medium as it moves through the transportation path. A print head prints to the print medium. A reverse feed mechanism disposed on the upstream side of the ejection opening reverse feeds a print medium transported in the downstream direction back to the upstream side of the transportation path by way of a form return path for guiding the reversed print medium.

28 Claims, 16 Drawing Sheets

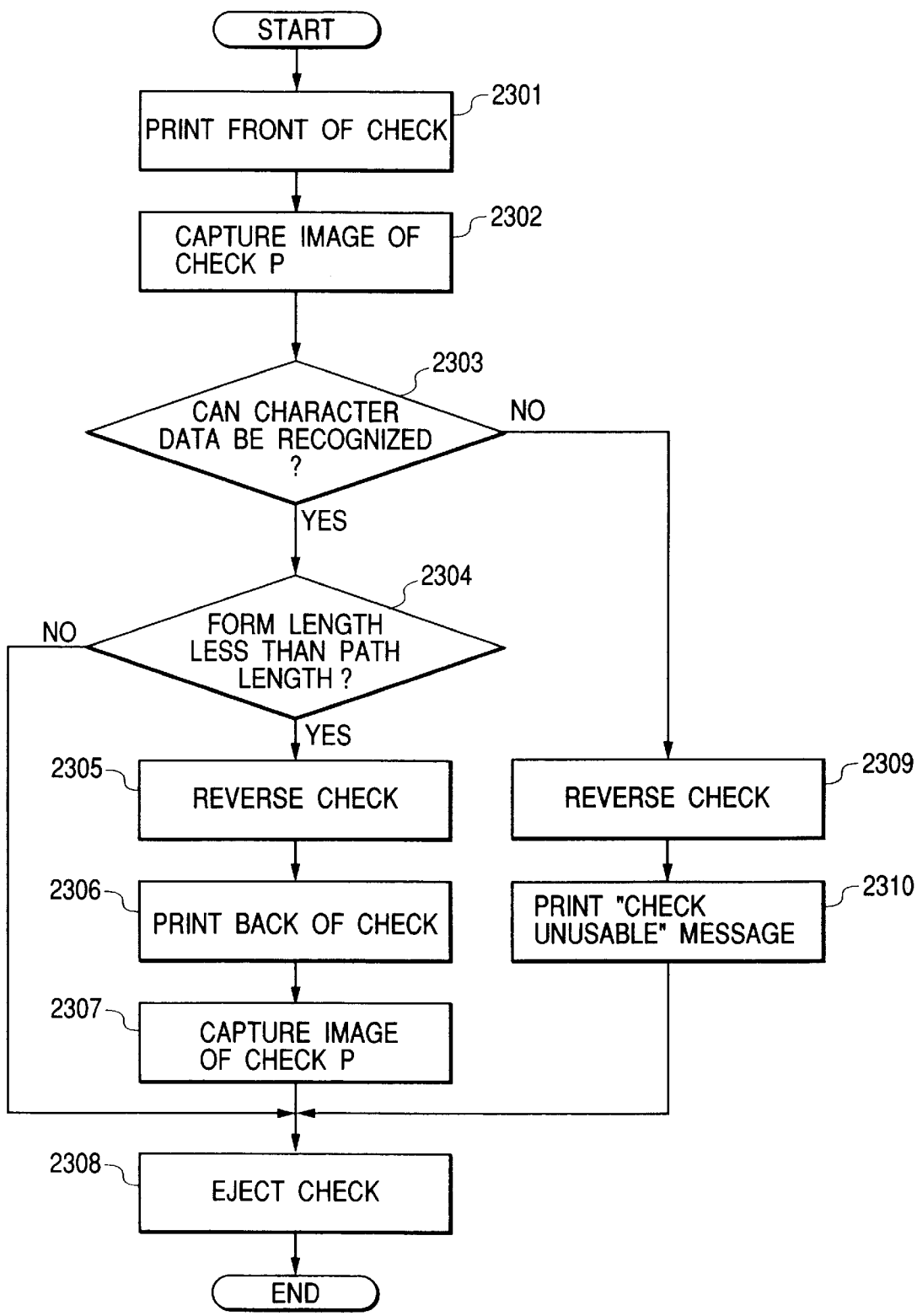

PRINTER AND CONTROL METHOD FOR THE SAME

TECHNICAL FIELD

This invention relates to a printer having an image scanner, and more particularly to a printer for printing and processing checks.

BACKGROUND

Payment systems capable of handling personal checks are commonly used in supermarkets and other retailers. As shown in FIG. 24 (A), these checks have a payment information area 240 on the front of the check for writing the amount, payee (store name), and the check writer's signature, and magnetic ink character text 241 for recording a unique check verification number. An endorsement area 242 is further provided on the back of the check as shown in FIG. 24 (B) for endorsement by the payee.

When a check is used in a supermarket, for example, the amount, store name, and customer's signature are written to payment information area 240, check validity is verified using magnetic ink character text 241, and the check is then endorsed in endorsement area 242. These tasks are typically accomplished by a process similar to the following.

First, the check issuer or user (referred to below as the customer) handwrites the amount and store name, and signs the check in payment information area 240. An MICR scanner at the checkout register then scans the magnetic ink character text 241 to obtain the bank and account number information. This information is then sent to the bank for check verification. If the check is verified, a printer at the checkout register prints the store's endorsement information to the endorsement area 242 on the back of the check. The check is then sent via the store's bank to the customer's bank where an image of the check is captured to microfilm and stored for a period of time.

A problem with this common process is that different devices are required for each step of the process and many of the steps are manually performed. The check must therefore be manually transferred between steps, and completing the transaction thus becomes timeconsuming. While printers having an integral MICR reader are now also available, the operator must still turn the check over between MICR scanning and endorsement printing steps.

Furthermore, the conventional transaction process requires the bank issuing the check to recover the physical check and record an image thereof to microfilm. There is, therefore, the danger of the check becoming lost or stolen during the transfer from retailer to issuing bank.

SUMMARY

In one aspect, a printer has a transportation path for transporting a check or other print medium from a form insertion opening to an ejection opening; a form transport device for moving the print medium through the transportation path; an image reader for capturing an image of the print medium transported through the transportation path; a printing mechanism for printing to the print medium transported through the transportation path; a reverse feed mechanism disposed to the transportation path upstream of the ejection opening for reversing to the upstream side a print medium transported to the downstream side of the transportation path; and a return path for guiding a print medium reverse fed by the reverse feed mechanism to a position on the transportation path on the upstream side of the image reader is featured.

In an implementation, the printer further has a path divider disposed at the junction between the downstream end of the transportation path and the return path. The path divider guides to the ejection opening a print medium advanced from the upstream side of the transportation path to the path junction, and guides to the return path a print medium reversed by the reverse feed mechanism from a downstream side of the transportation path to the path junction.

In an implementation, the path divider is a path switch supported so that it can pivot on a shaft. The path switch is normally urged in a direction closing the transportation path at the path junction, and can be opened by the force of the leading edge of a print medium advanced toward the ejection opening and contacting the path switch.

Furthermore, the form transport device comprises two drive side transport rollers disposed at mutually separated positions. In addition, a circulation path formed by the transportation path and return path is disposed around these two rollers.

In yet another implementation, the printer additionally comprises a third transport roller driven in forward and reverse directions and disposed to the transportation path upstream of the ejection opening. The reverse feed mechanism in this case is achieved by driving the third transport roller in reverse.

In another implementation, a printer further has a reversible motor; a first gear set for driving the third transport roller forward or reverse according to the direction of motor rotation; and a second gear set for driving the two transport rollers of the form transport device forward regardless of the direction of motor rotation.

In this implementation, the second gear set comprises two one-way clutches supported on a rotating shaft of one transport roller to alternately transfer torque in the same direction of rotation to the transport roller, a third gear set for transferring drive force from the motor during forward motor drive to the transport roller by way of one intervening oneway clutch, and a fourth gear set for transferring drive force from the motor during reverse motor drive to the transport roller by way of the other intervening one-way clutch.

In this implementation, the printing mechanism of this printer has a print head, and a print head transport mechanism for moving the print head substantially orthogonal to the print medium transport direction.

In still another implementation, the printer has a magnetic ink character reader for reading magnetic ink characters on the print medium. The magnetic ink character reader is disposed to the transportation path downstream of the image reader.

In this implementation, the magnetic ink character reader has a magnetic head; and a magnetic head transport mechanism for moving the magnetic head substantially orthogonal to the print medium transport direction.

In another implementation, the magnetic head transport mechanism is achieved by the print head transport mechanism.

In another implementation, the printer comprises a character recognition device for recognizing magnetic ink characters on the print medium as character information, the magnetic ink characters being detected in the image of the print medium captured by the image reader.

In another implementation, the printer comprises a data capturing device for obtaining information relating to a print area of the print medium from the print medium image captured by the image reader. This captured data is then used to control the printing mechanism.

In another implementation, the printer comprises a form length detector for detecting a length of a print medium guided through the transportation path, and a reverse feed controller for prohibiting reverse feed of the print medium by the reverse feed mechanism when the print medium length detected by the length detector is longer than a length of the form circulation path formed by the transportation path and return path.

In another aspect, a control method for a printer having the printing mechanism thereof disposed downstream of an image reader disposed to a transportation path is featured. This control method includes reading an image of a print medium, printing to a first side of the print medium, feeding the print medium to the return path by reversing the print medium transport direction, and printing to a second side of the print medium by the printing mechanism.

In an implementation, the control method further features feeding the print medium to the return path by reversing the print medium transport direction by the reverse feed mechanism, capturing an image of the print medium during form transportation, and ejecting the print medium from the ejection opening.

In still another aspect, a control method for a printer having the printing mechanism thereof disposed upstream of an image reader disposed to a transportation path is featured. This control method includes a printing to a first side of the print medium by the printing mechanism, reading an image of the printed first side of the print medium, feeding the print medium to the return path by reversing the print medium transport direction by the reverse feed mechanism, printing to a second side of the print medium by the printing mechanism, reading an image of the printed second side of the print medium, and ejecting the print medium from the ejection opening.

In yet another aspect, a control method for a printer having a form length detection device is featured. This control method includes printing to a first side of the print medium by the printing mechanism, reading an image of the printed first side of the print medium, detecting by the length detection device a length of the print medium guided to the transportation path, and ejecting the print medium from the ejection opening when the print medium length detected by the length detector is longer than a length of the form circulation path formed by the transportation path and return path.

An advantage of the above-described aspects and implementations is the enablement of a more efficient handling and completion of check transactions.

Another advantage provided by implementations of the printer is that it can complete these check transactions without operator intervention.

Yet another advantage provides a printer that is compact and suited for high speed check processing.

The details of one or more embodiments of the invention are set forth in the accompanying drawings and the description below. Other features and advantages of the invention will be apparent from the description and drawings, and from the claims.

DESCRIPTION OF DRAWINGS

FIG. 23 is a flow chart of an implementation of a check processing method performed by the printer shown in FIG. 16.

KEY TO THE FIGURES

Figure 1:
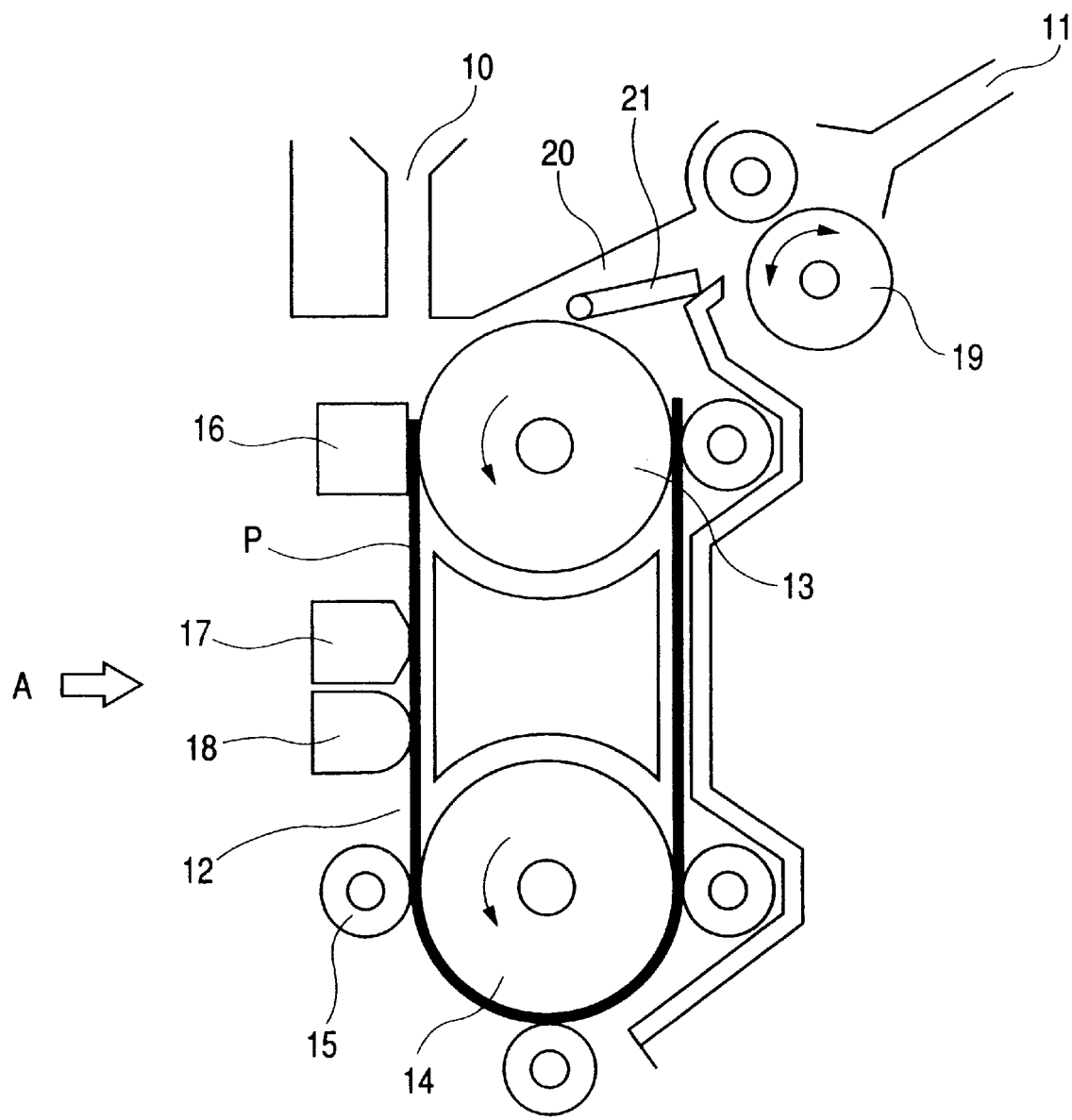
FIG. 1 is a typical side view showing the internal structure of a printer according to a first embodiment.

P check
10 insertion opening
11 ejection opening
12 transportation path
13, 14 drive rollers
15 auxiliary rollers
16 scanner
17 print head
18 magnetic head
19 transport roller pair
20 form return path
21 path switch
30 controller
31 image interpreter
33 communication means
34 printing means
35 transportation means Like reference symbols in the various drawings indicate like elements.

DETAILED DESCRIPTION

FIG. 1 is a typical side view of the internal structure of a printer according to an embodiment. As shown in the figure, this printer comprises a transportation path 12 for transporting a check P inserted from insertion opening 10 to form ejection opening 11, and two drive rollers 13 and 14 disposed separated from each other. The transportation path 12 is a basically U-shaped path formed passing around the drive rollers 13 and 14. A check P supplied to the printer from insertion opening 10 is first pulled into the transportation path 12 by drive roller 13, then fed upwards by means of drive roller 14 and cooperating auxiliary rollers 15, and then once again advanced toward the ejection opening 11 by drive roller 13. The check P is assumed herein to be inserted to the insertion opening 10 and transported from the long side of the check P.

A scanner 16, print head 17, and magnetic head 18 are disposed along the transportation path 12. The scanner 16 is disposed opposite the drive roller 13 at a position close to the insertion opening 10 of the transportation path 12. As described more fully below, the scanner 16 captures an image of one side of the check P, and covers the width of the transportation path 12, that is, depthwise as seen in FIG. 1, so that it scans the full width of a check P as the check passes between the scanner 16 and drive roller 13. In this embodiment, the scanner 16 captures an image of the check P front twice. The first image captured is used for analyzing the magnetic ink characters printed to the check P. The second captured image is transmitted to the bank upon which the check is drawn, and is used in place of conventional microfilm storage. The scanner 16 is also used as a form edge detector for sensing a check edge.

It is therefore possible to both capture an image of the check and detect the edge of the check by use of the scanner 16. The scanner 16 outputs the captured image data to an optical character reader (OCR) used as the character recognition device. This OCR interprets the characters written to the check with magnetic ink.

Figure 2:
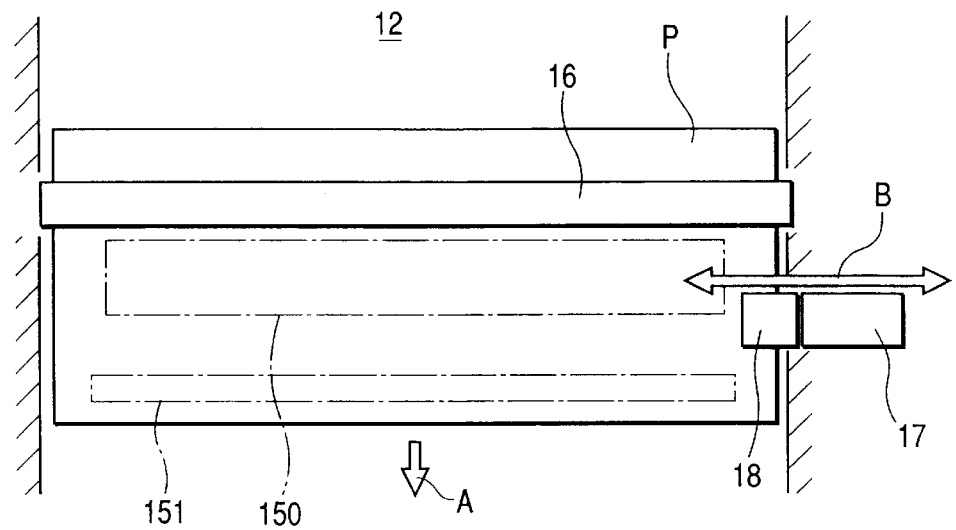
FIG. 2 is a view from arrow A in FIG. 1 showing the relative positions of the scanner, print head, and magnetic head of the printer.

The print head 17 and magnetic head 18 are downstream of the scanner 16. For convenience of illustration only the print head 17 and magnetic head 18 are shown side by side in the transportation direction of check P in FIG. 1, but they are actually side by side in the depth direction of FIG. 1, that is, across the width of the transportation path as shown in FIG. 2.

The print head 17 prints the amount and store name to the payment information area 240 on the check P front, and the endorsement information to the endorsement area 242 on the back of the check P. The magnetic head 18 is for reading the magnetic ink character text 241 on the check P front, and is typically known as a magnetic ink character reader (MICR). The magnetic ink character data read by the magnetic head 18 is used when the scanner 16 was not able to read the magnetic ink characters with good results. It is also possible to leave character recognition solely to the scanner 16 and use the magnetic head 18 only for detecting the presence of magnetism in the ink. Though not shown in the figure, the print head 17 and magnetic head 18 are mounted on the same carriage and are moved by the same transportation mechanism across the transportation path 12. The print head 17 is driven in conjunction with this movement when printing to the check, and the magnetic head 18 is driven when reading the magnetic ink characters.

A transport roller pair 19 is located near the ejection opening 11. The transport roller pair 19 is controlled to turn in forward or reverse direction. When turning in the forward direction, a check P in the transportation path 12 is carried toward to the ejection opening 11. When turning in the reverse direction, a check P that has been advanced to the ejection opening 11 is fed back into form return path 20.

This form return path 20 is a path linking a part of the transportation path 12 near the insertion opening 10 with a part of the path 12 near ejection opening 11. As shown in FIG. 1, the substantially U-shaped transportation path 12 and this form return path 20 together form a circumferential path around drive rollers 13 and 14. Part of drive roller 13 projects into this form return path 20 so that rotation of the drive roller 13 carries a check P reversed into form return path 20 to a point on the upstream end of transportation path 12. This device that a check P reversed by transport roller pair 19 is inverted front and back and then fed back into transportation path 12.

A path switch 21 for switching the form path between transportation path 12 and form return path 20 is provided upstream of transport roller pair 19 at the junction between transportation path 12 and form return path 20. This path switch 21 is normally held by a spring or other urging mechanisms not shown in the figure so that the path junction is closed to the upstream end of the transportation path 12 and the form return path 20 is open to the downstream end of the transportation path 12. The leading edge of the check P advanced from the upstream side of the transportation path 12 strikes the path switch 21 at the path junction. The form transportation force and the rigidity of the check P open the path switch 21 in resistance to the urging mechanism so that check P can be advanced to the ejection opening 11. When the check P is then advanced to the ejection opening 11 by the transport roller pair 19 and the trailing edge of the check passes the path junction, the path switch 21 returns to the normal position and form return path 20 is open. If the transport roller pair 19 is then driven in reverse, the check P will be reversed through form return path 20 instead of transportation path 12.

FIG. 2 is a view from arrow A in FIG. 1 clearly showing the relative positions of the scanner 16, print head 17, and magnetic head 18 to the transportation path 12. The scanning width of the scanner 16 is approximately equal to the width of the check P. By driving the scanner 16 as the check P is advanced in the direction of arrow A, the entire surface of check P can be read. As noted above, the print head 17 and magnetic head 18 are mounted on a common carriage, and travel in the direction of arrow B orthogonal to form transportation direction A. When the check P is advanced and the magnetic ink character text area 241 reaches the path area passing magnetic head 18, the carriage is driven so that the magnetic head 18 reads the magnetic ink characters. When the payment information area 240 reaches the path passing print head 17, the carriage is again driven to print by the print head 17.

Figure 3:
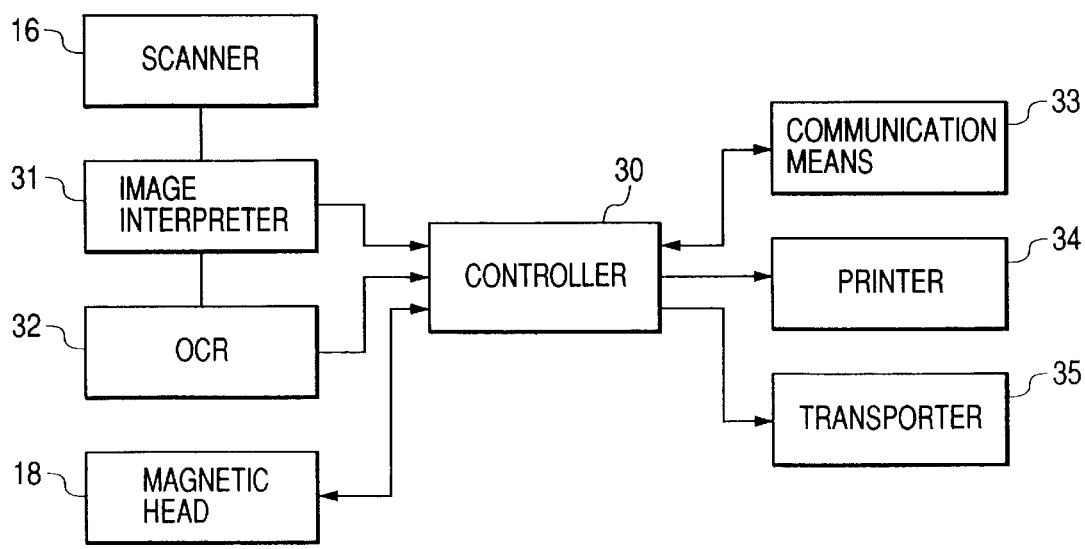
FIG. 3 is a control block diagram for the printer shown in FIG. 1.

FIG. 3 is a block diagram of a controller used with this printer. Printer control is achieved primarily by device of controller 30 using a CPU and a control program the controller 30 runs on the CPU. Check image data captured by the scanner 16 is analyzed by the image interpreter 31 to detect information, including the form edge position, print area, and magnetic ink character area. This information is sent to the controller 30.

Based on the information indicating the magnetic ink character print area, the magnetic ink character area is extracted and the characters are recognized (read) by the OCR 32. The magnetic ink characters are also read by the magnetic head 18. The magnetic ink character data is then transmitted by way of communication device 33 to a host computer at a bank or other financial institution for verification.

The controller 30 also controls a printer 34, transporter 35, scanner 16, magnetic head 18, and other components in response to information captured from the check P or control commands from the operator.

Figure 4:
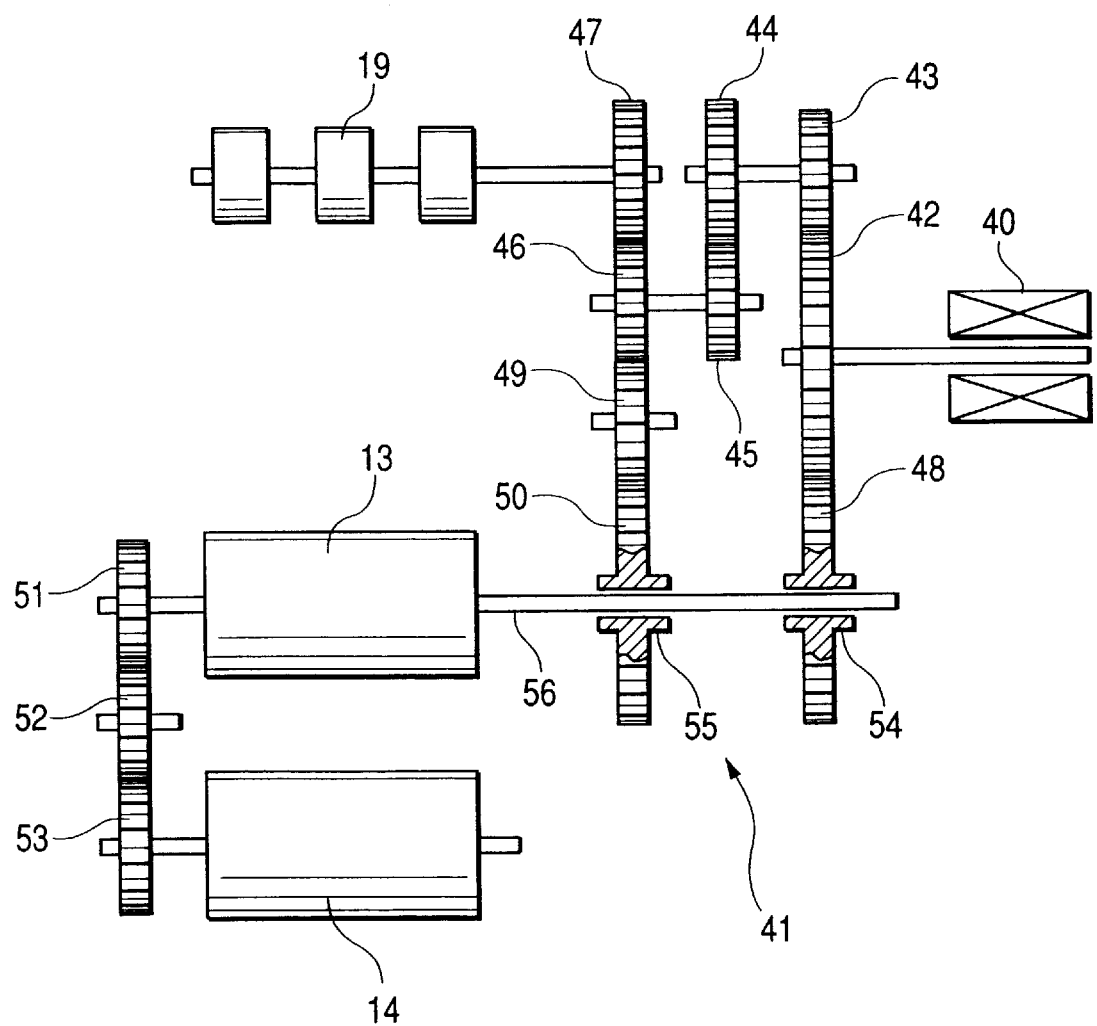
FIG. 4 shows a drive system in the printer shown in FIG. 1.

FIG. 4 shows the drive system for the drive rollers 13 and 14 and transport roller pair 19. As shown in the figure, drive rollers 13 and 14 and transport roller pair 19 are rotationally driven by drive power supplied from a single reversible motor 40 and transferred by gear set 41. This gear set 41 causes transport roller pair 19 to turn forward or reverse depending upon the direction of motor 40 rotation, and always drive drive rollers 13 and 14 forward regardless of the direction of motor 40 rotation.

The drive power of motor 40 is transferred through gears 42, 43, 44, 45, 46, and 47 for driving transport roller pair 19. To transport the check P to the ejection opening 11, transport roller pair 19 is driven in the forward direction by driving motor 40 in the forward direction. Check P is thus carried toward the ejection opening 11. To reverse the check P from ejection opening 11 to form return path 20, the motor 40 is reversed. This causes transport roller pair 19 to move in the reverse direction and thus reverses the check P to the form return path 20.

To drive drive rollers 13 and 14, the gear set 41 additionally uses gears 48, 49, 50, 51, 52, and 53, and two one-way clutches 54 and 55. Gears 51 and 53 are mounted on the respective drive shafts of drive rollers 13 and 14 and are linked by meshing with an intermediate gear 52. Drive power transferred to drive drive roller 13 in a forward direction is thus also transferred to the drive shaft gear 53 of drive roller 14, and thus causes drive roller 14 to be driven in the same forward direction.

The two one-way clutches 54 and 55 are both disposed to the drive shaft 56 of the one drive roller 13, and transfer only the forward rotation of gears 48 and 50 to the drive roller 13. When these gears turn in the reverse direction, the clutches 54 and 55 disengage from drive shaft 56, and drive power is thus not transferred to the drive shaft 56. When the motor 40 is driven forward, drive power is transferred from gear 42 to drive gear 48 forward. When gear 48 turns forward, clutch 54 engages drive shaft 56, thus transferring the drive power to drive roller 13 and thereby driving drive roller 13 forward.

Drive power from motor 40 is further transferred at this time by way of gears 42, 43, 44, 45, 46, and 49 to gear 50. Gear 50 at this time turns in reverse, but drive power is not transferred to drive shaft 56 by clutch 55, and gear 50 turns freely to drive shaft 56, which is driven in the forward direction at this time by the drive power transferred from gear 48.

When motor 40 turns in reverse, that is, when the transport roller pair 19 is driven in reverse, drive power is transferred by way of gears 42, 43, 44, 45, 46 and 49 to drive gear 50 forward. When gear 50 turns forward, clutch 55 engages drive shaft 56, drive power is transferred to drive roller 13, and drive roller 13 thus turns forward. Drive power from the motor 40 is also transferred by way of gear 42 to gear 48 at this time. This time gear 48 turns in reverse but because clutch 54 disengages drive power is not transferred from gear 48 to drive shaft 56, and gear 48 turns freely to drive shaft 56, which is not driven forward by device of drive power transferred from gear 50.

Whether motor 40 drives forward or reverse, drive rollers 13 and 14 are always driven in the forward direction.

Figure 13:
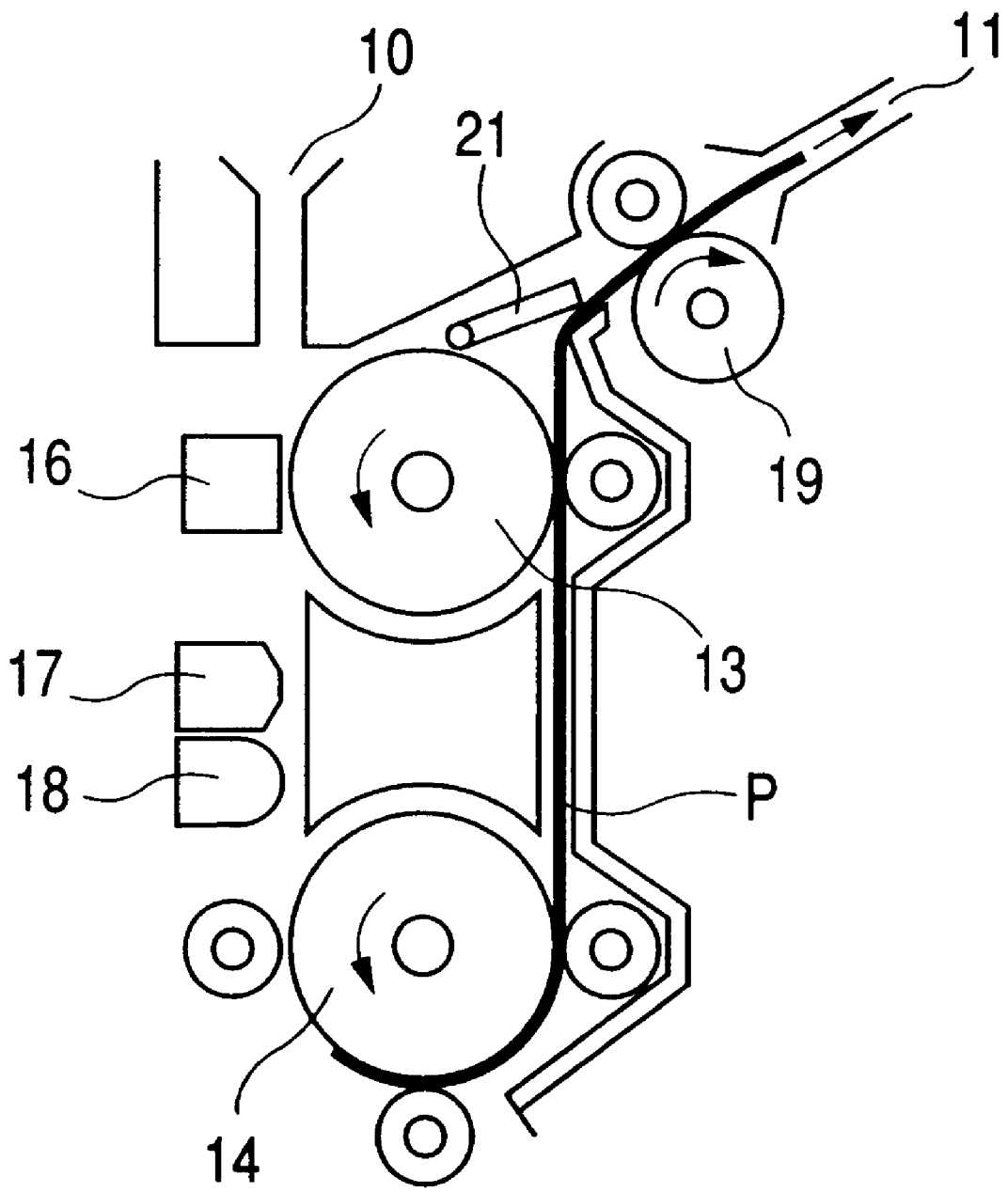
Figure 14:
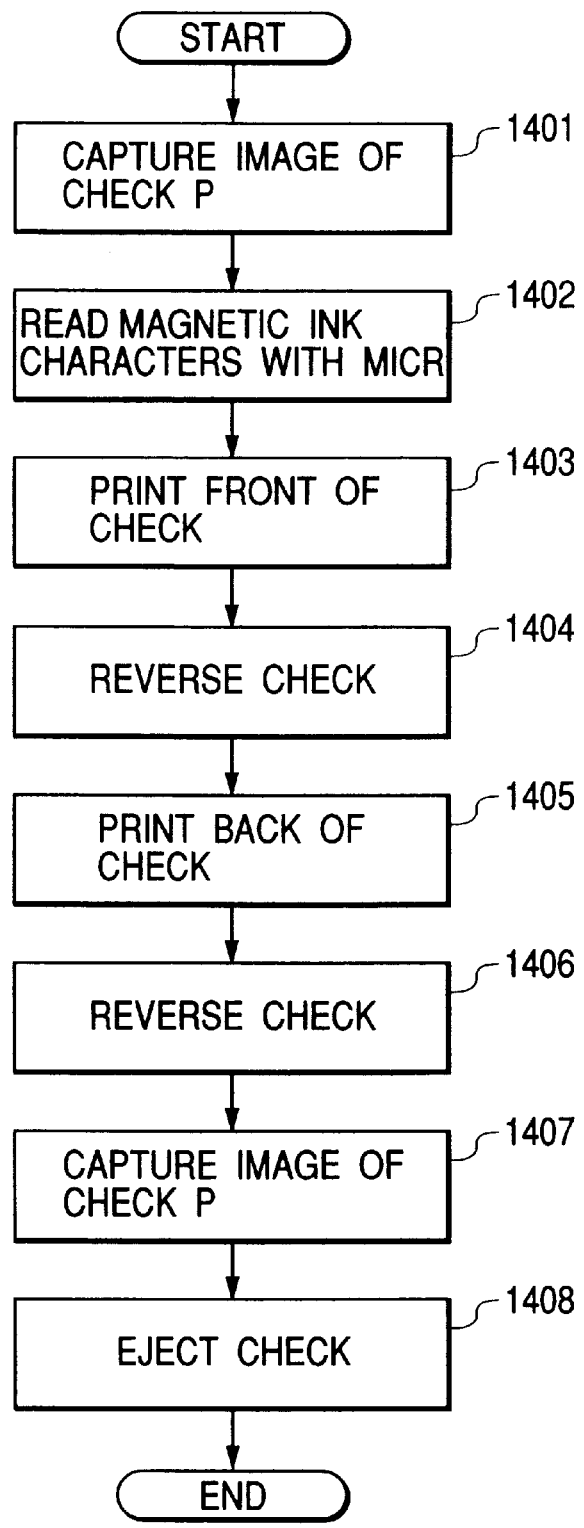
FIG. 14 is a flow chart of an implementation of a check processing method performed by the printer shown in FIG. 1.
Figure 15:
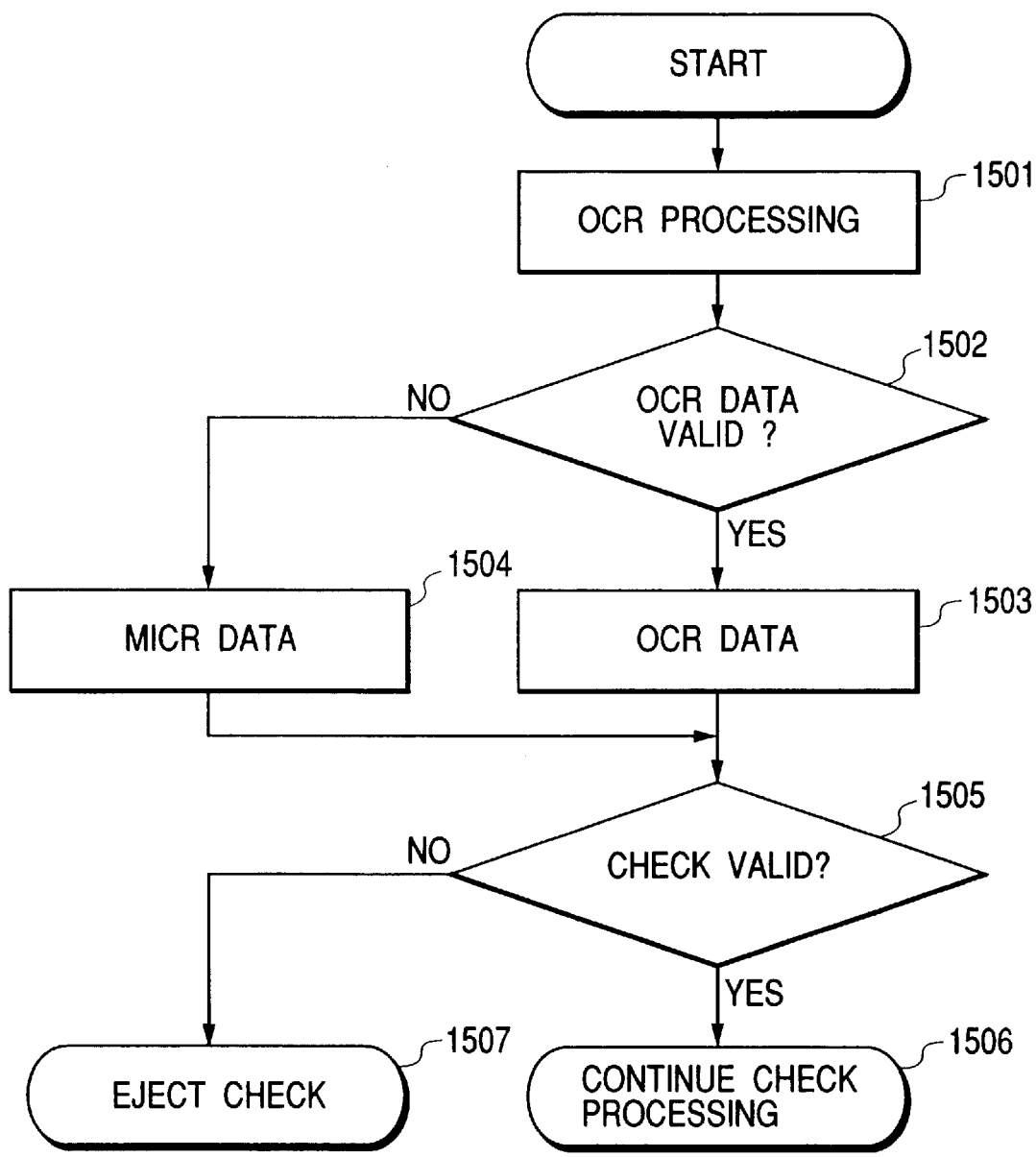
FIG. 15 is a flow chart of an implementation of magnetic ink character verification process in the printer shown in FIG. 1.

A procedure for processing a check P by this printer is described next below with reference to FIGS. 5 to 15. FIG. 5 to FIG. 13 show various stages in the processing of a check P inserted to this printer. FIGS. 14 and 15 are flow charts of this check P processing routine.

When a customer uses a check to pay for a store purchase, the checkout clerk (operator) first has the customer sign the check in the specified space before the check is processed by the printer. Upon receiving the signed blank check from the customer, the operator inserts the check P to the insertion opening 10 with the front of the check facing the side of the transportation path 12 on which the scanner 16 is disposed.

Figure 5:
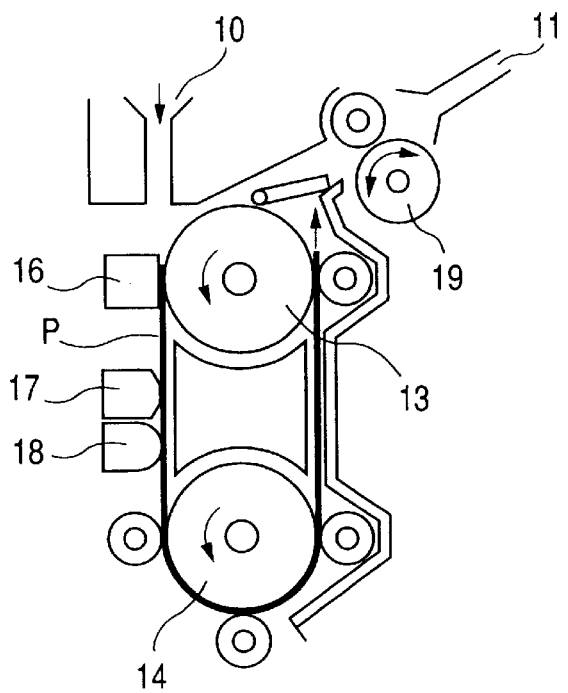
FIG. 5 to FIG. 13 illustrate a method for processing a check P inserted to the printer shown in FIG. 1.

A check P inserted to the printer is advanced by drive rollers 13 and 14 through transportation path 12 toward the ejection opening 11 as shown in FIG. 5. As the check P passes through the transportation path 12, an image of the check front is first captured by scanner 16 (step 1401 in FIG. 14). The magnetic ink characters are then scanned and read by the magnetic head 18 as area 241 passes thereby (1402). When the payment information area 240 reaches print head 17, the check amount and store name (payee) are printed (1403).

Figure 6:
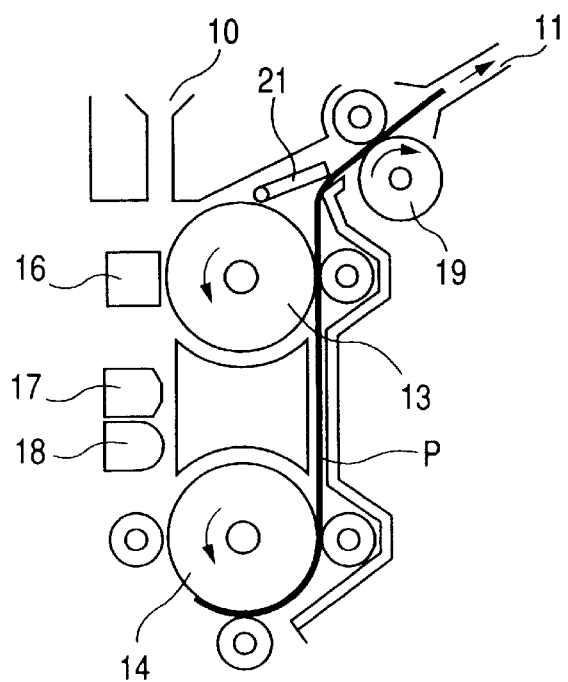
Figure 7:
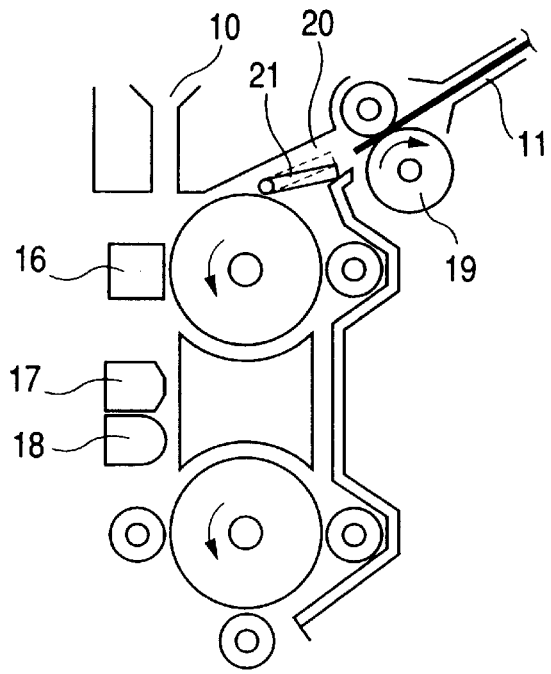
Figure 8:
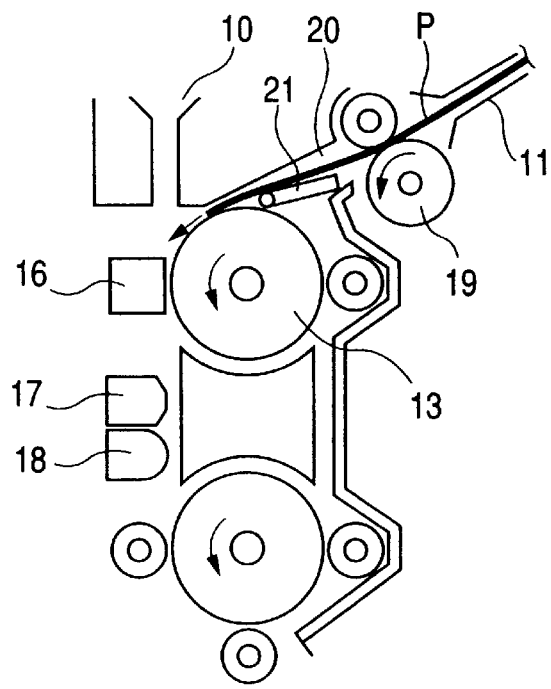

When processing the check front is completed, the check P is advanced to the ejection opening 11 as shown in FIG. 6. The leading edge of the check P opens the path switch 21 at the junction with form return path 20, and the check P is thus fed to the transport roller pair 19. The check P is then advanced to the ejection opening 11 by transport roller pair 19 until the trailing edge of the check passes the path junction as shown in FIG. 7. This allows path switch 21 to return to its previous normal position, thus opening form return path 20.

Rotation of the transport roller pair 19 is reversed once the path switch 21 returns so that the check P returns through form return path 20 to a position on the upstream side of the transportation path 12 (1404). This operation inverts check P so that it is passed again through transportation path 12 but with the opposite (endorsement) side presented to the print head 17.

The check P verification process shown in FIG. 15 is accomplished either before or parallel to this form inverting process. Referring to FIG. 15, the first step in this verification process is to recognize the magnetic ink characters from the image data captured by the scanner 16 (1501). Next is to detect whether character recognition based on the image data was appropriately accomplished (1502). If it was, the character data recognized from the image data is checked with the bank (1503). However, if the text was not correctly read due, for example, to soiling of the magnetic ink character area, the character data read by the magnetic head 18 is used for verification with the bank (1504). If the check is determined valid after waiting for the bank's response (1505), control returns to the procedure shown in FIG. 14 to finish check processing (1506). However, if the check is not confirmed by the bank to be valid, processing terminates and the check P is ejected from ejection opening 11 (1507).

Figure 9:
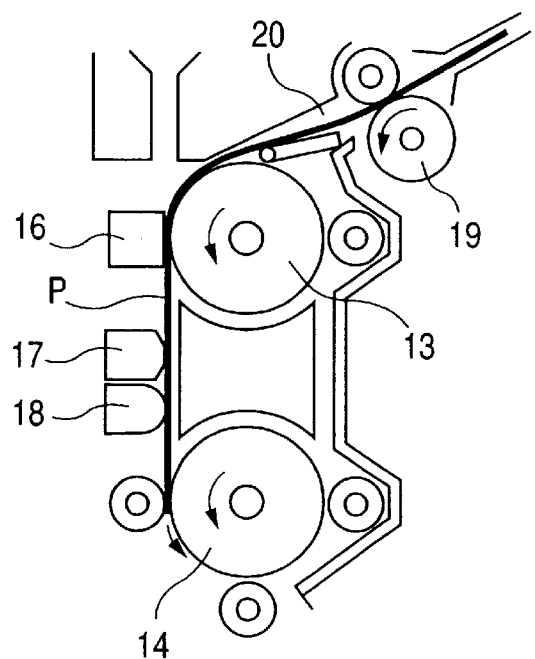
Figure 10:
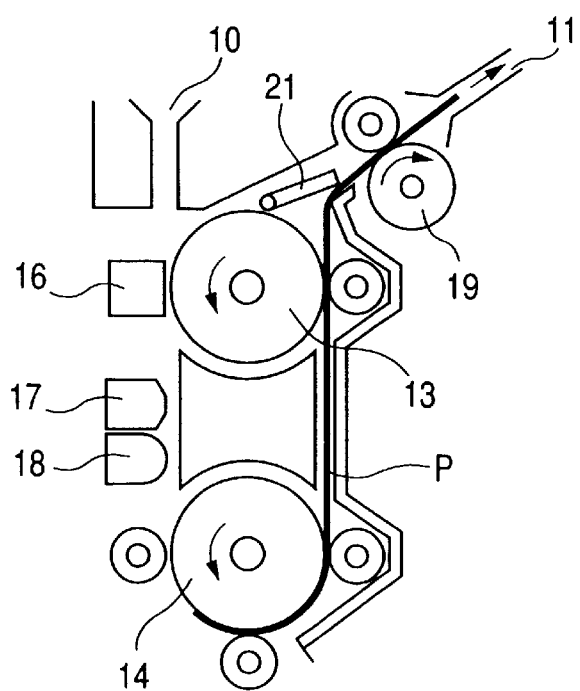
Figure 11:
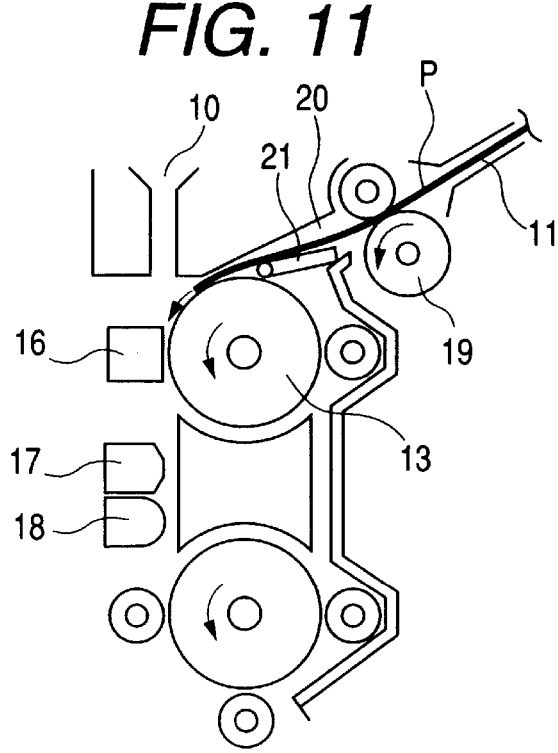
Figure 12:
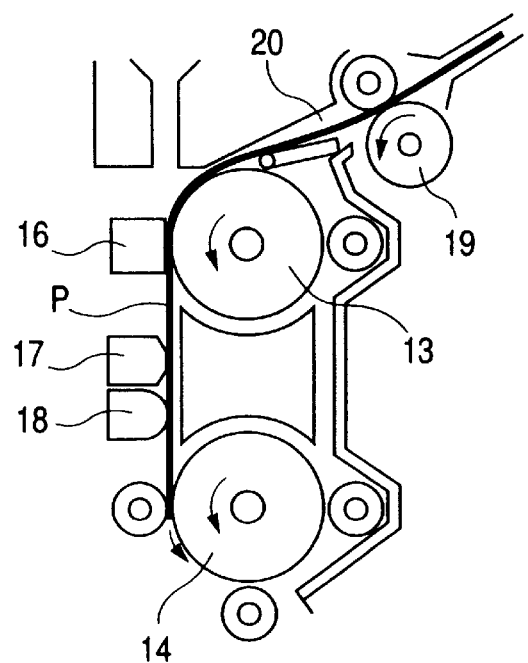

Once check verification ends, the check P is transported as shown in FIG. 9 so that the endorsement area 242 is presented to the print head 17. This time the print head 17 prints the check endorsement information (1405). When printing is completed, the check P is advanced to the ejection opening 11 as shown in FIG. 10. When the trailing edge again passes the path switch 21, the check P is again reversed by the transport roller pair 19 and returned to the upstream side of transportation path 12 as shown in FIG. 11 (1406). The check P is thus again inverted so that it passes once more through transportation path 12, this time with the front facing scanner 16. The scanner 16 is then again driven as the check passes by to capture an image of the completed signed check P (1407). This time the check is scanned with the face of the check is completely filled out, containing the customer's signature, check amount, payee, and magnetic ink character account information. The resulting image is then sent to the bank where it is stored.

Because the scanner 16 is disposed lengthwise to the check P, it is also possible to capture an image of only those parts of the check from which an image needs to be archived, such as the customer signature, amount, and payee. The size of the captured image, and thus the amount of data to be stored, can thereby be reduced and the processing time shortened. After scanning the check front, the check P is advanced through transportation path 12 and ejected from the ejection opening 11 as shown in FIG. 13 (1408). This completes the check P processing routine.

The front of the check P is scanned twice 1401, 1407 in FIG. 14. The primary purpose of scanning 1401, however, is to supplement reading the magnetic ink characters with an OCR function, and the object of step 1407 is to capture and store an image of the completed check. Other capture methods are possible. For example, it is also possible to capture 1401 an image of only that part of the check not printed 1403, capture 1407 an image of only that part printed 1403, and then combine these two scanned images to generate an image of the entire front side of the check P. This makes it possible to process the scanned image data in separate batches using, for example, the check P transportation time, and thereby improve process throughput.

It is also possible to detect the check P insertion direction, that is, whether the front or back was inserted facing the scanner 16, for example, using the image data captured 1401. This can be accomplished by generating standard patterns from scanned check images, calculating a correlation between these standard check patterns and the image captured from the inserted check, and using this correlation to detect the insertion direction. By detecting the check P insertion direction, and thus the check front and back, check inversion 1404 can be accomplished before MICR reading 1402 if the check P was inserted backwards so that the subsequent check processing routine can be performed smoothly.

Furthermore, if the check P insertion direction is opposite the normal direction, for example, if the check is inserted upside down, the position at which the check P is stopped in MICR reading 1402 can be adjusted so that the magnetic head 18 reliably scans the MICR text. Accurate recognition can also be assured in this case by rotating the sample data used for the MICR operation 180 degrees. The print data can also be rotated 180 degrees in printing steps 1403, 1405 to assure the data is correctly printed.

Figure 16:
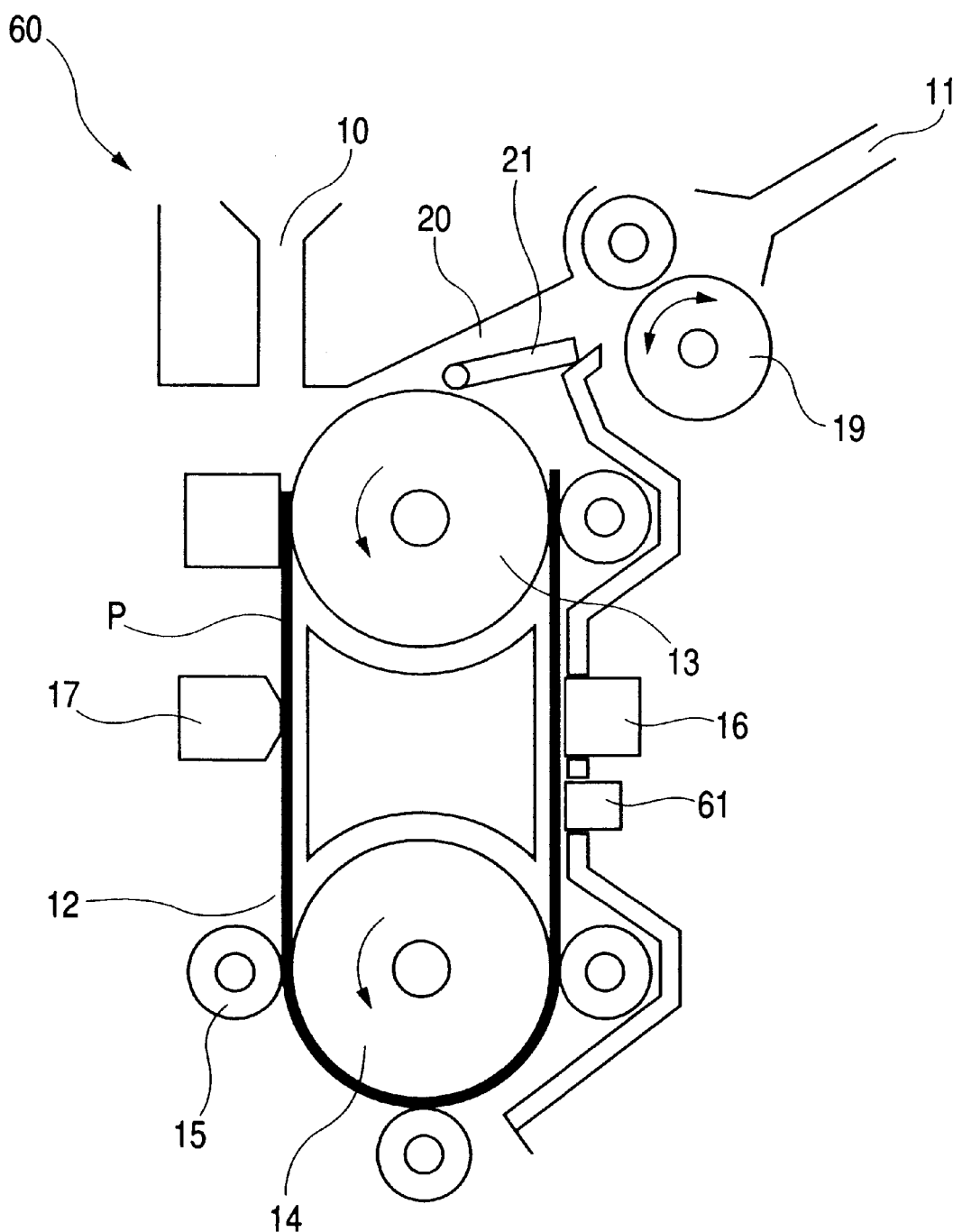
FIG. 16 is a side view showing the internal structure of a printer according to a second embodiment.

An alternative embodiment is described next below with reference to FIGS. 16 to 23. FIG. 16 is a typical side view showing the internal structure of a printer according to this embodiment, FIGS. 17 to 22 show the show various stages in the processing of a check P inserted to this printer. FIG. 23 is a flow chart of the check P processing routine. Like parts in a printer according to this embodiment and the embodiment described above are identified by like reference numerals, and further description thereof is omitted below. Furthermore, the control system shown in FIG. 3 and the drive control system as shown in FIG. 4 are also used in this exemplary printer, and further description thereof is also omitted below.

The printer 60 comprises a scanner 16 identical to that in the preceding embodiment. What differs is that this scanner 16 is disposed downstream of the print head 17, that is, on the opposite side of the U-shaped transportation path 12 from print head 17. As described below with reference to control of this printer 60, scanner 16 scans the check P after it has been printed by the print head 17, thus shortening the check P processing time and improving throughput.

A printer 60 according to this embodiment does not have a magnetic head, and scanner 16 alone is used for recognizing the magnetic ink characters.

This printer 60 further includes a form edge sensor 61 disposed adjacent the transportation path 12 on the upstream side of scanner 16. This form edge sensor 61 detects the leading and trailing edges of a form passing through transportation path 12. In the control process described further below, the printer 60 controller measures the length of the form being processed based on the output from form edge sensor 61. In other words, the number of feed steps advanced by the drive rollers 13 and 14 between when the form edge sensor 61 detects the leading and trailing edges of the form is counted. This count is then used to calculate the form length.

Form length detection is used to control form reversal by the transport roller pair 19. If the form inserted from insertion opening 10 is not check P and the length of the inserted form in the form advancing direction is greater than the length of the circulation path (the circulation path length below) formed by transportation path 12 and form return path 20, a paper jam can be caused at the path junction by feeding the form in reverse. That is, if a form longer than the circulation path length is advanced to the transportation path 12 by reverse rotation of the transport roller pair 19, the leading edge of the form will reach the path junction before the trailing edge thereof passes back through the path junction. This device that the leading edge pushes the path switch 21 up and thereby closes the form return path 20, possibly resulting in the trailing edge of the form being pinched. To prevent this, a printer 60 according to this embodiment of the invention is controlled to simply eject and not reverse any inserted form that is longer than the circulation path length.

Processing a check P by this printer 60 is described next below with reference to FIG. 17 to FIG. 22 and the flow chart in FIG. 23.

When a customer uses a check to pay for a store purchase, the checkout clerk (operator) first has the customer sign the check in the specified space before the check is processed by the printer. Upon receiving the signed blank check from the customer, the operator inserts the check P to the insertion opening 10 with the front of the check facing the side of the transportation path 12 on which the print head 17 is disposed.

Figure 17:
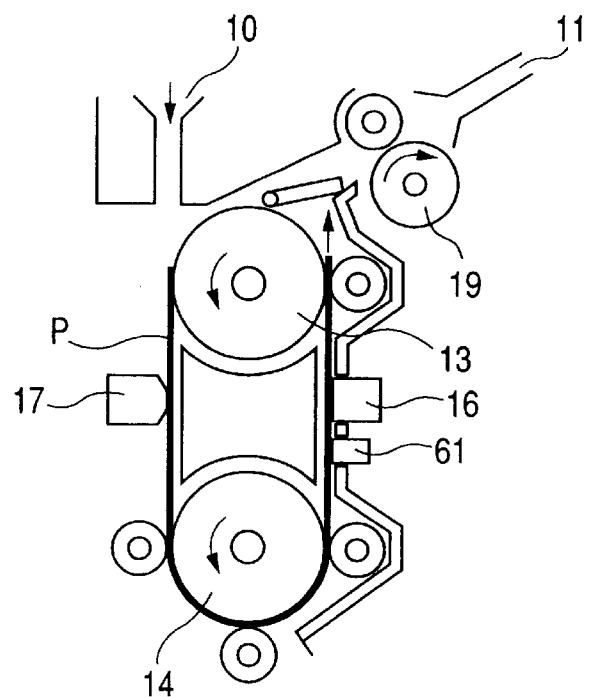
FIG. 17 to FIG. 22 illustrate a method for processing a check P inserted to the printer shown in FIG. 16.

A check P inserted to the printer is advanced by drive rollers 13 and 14 through transportation path 12 toward the ejection opening 11 as shown in FIG. 17. When the payment information area 240 reaches print head 17, the check amount and store name (payee) are printed (2301).

When the leading edge of check P reaches form edge sensor 61, the leading edge is detected and a signal is sent to the controller. The controller then starts counting the steps advanced by drive roller 13 from this base point. After the check P face is printed, an image thereof is captured by scanner 16 on the downstream side of print head 17 (2302). The magnetic ink characters on the check P are included in this image captured by scanner 16. The image captured by the scanner 16 at this time thus contains the customer signature, amount and payee information, and the magnetic ink character information, and is therefore transmitted to the issuing bank for storage.

Figure 18:
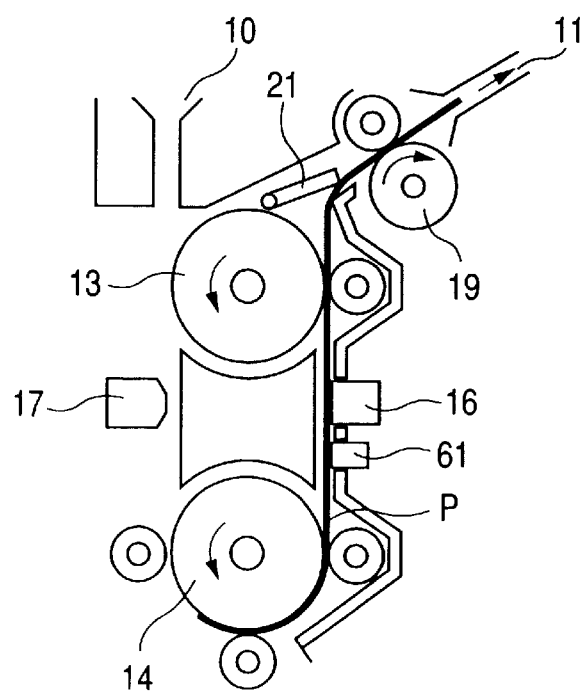
Figure 19:
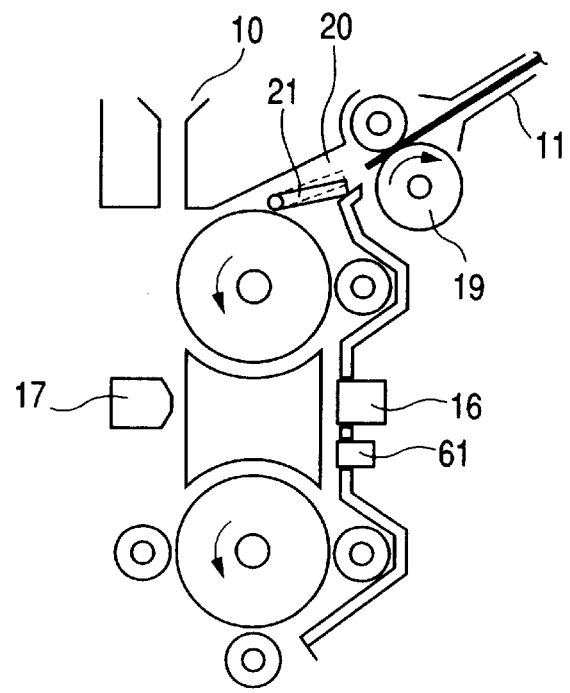

As shown in FIG. 18, the leading edge of check P reaches the path junction with form return path 20 while the scanner 16 is capturing an image of the check face. The leading edge thus pushes the path switch 21 at the junction to form return path 20 open, and the check P is guided to transport roller pair 19. As shown in FIG. 19, the transport roller pair 19 advances the check P to ejection opening 11. When the trailing edge passes the path junction, the path switch 21 returns to the previous position and opens form return path 20.

In this embodiment, the length of check P is measured and whether the results of magnetic ink character recognition are appropriate is determined before the check P is reversed from the position shown in FIG. 19 (2303). If character recognition was correct, the next step 2304 is performed while at the same time the character data is transmitted to the bank for verification as in the preceding embodiment.

If character recognition was not appropriately accomplished because of magnetic ink character soiling, for example, the transport roller pair 19 is driven to reverse feed the check P so that the back side thereof is presented to the print head 17 (2309). In this case a note to the effect that "this check cannot be used" is printed in a specific area (2310). It should be noted that steps 2309 and 2310 can be performed when check P validity is not verified by the bank. Furthermore, if it is detected in step 2303 that character recognition was not appropriately completed, further processing can be immediately terminated with the procedure skipping directly to step 2308 and the check P being immediately ejected.

If step 2303 detects that character recognition was appropriately completed, the check P length is next calculated and compared with the circulation path length. The form edge sensor 61 detects when the trailing edge of check P passes thereby as it is advanced to ejection opening 11 as shown in FIG. 18. A signal is then sent to the controller to stop counting drive roller 13 steps. Based on the number of steps counted by the controller and the distance advanced by drive roller 13 with each step, the controller can calculate the length of check P. The calculated check P length is then compared with the circulation path length (2304). If the check P length is greater than the circulation path length, a paper jam could result by reversing the form through form return path 20. Processing is therefore terminated by continuing to drive the transport roller pair 19 forward and eject the check P from ejection opening 11 (2308).

Figure 20:
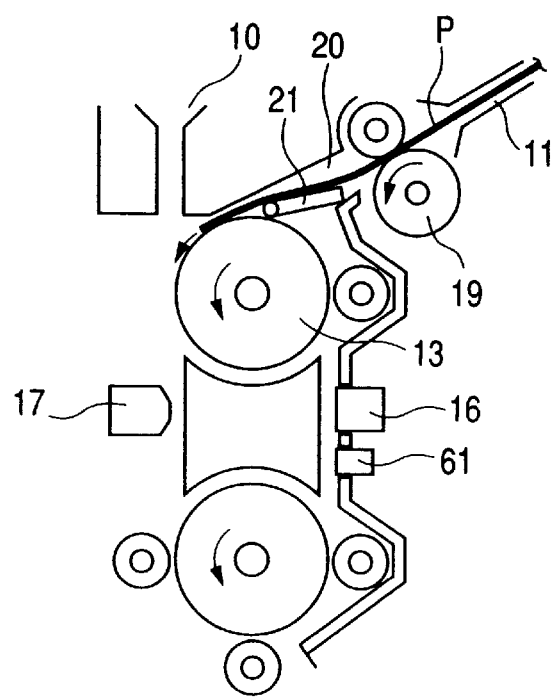
Figure 21:
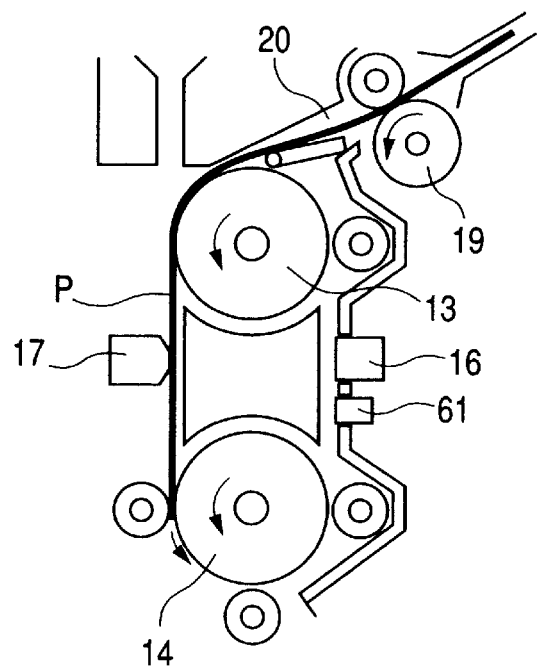

However, if the check P length is less than the circulation path length, the check P is determined to be an appropriate length and check processing continues. That is, the transport roller pair 19 is reversed so that the check P returns from form return path 20 to a position upstream of the transportation path 12 as shown in FIG. 20 (2305).

Figure 22:
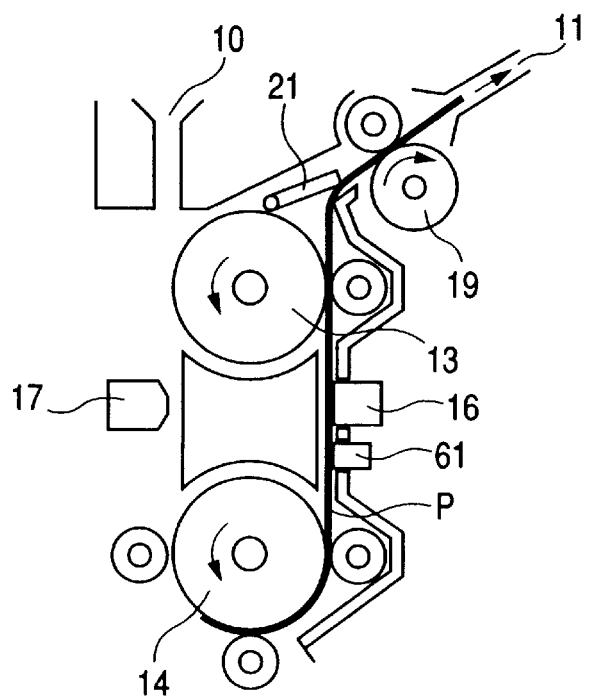
Figure 24A:
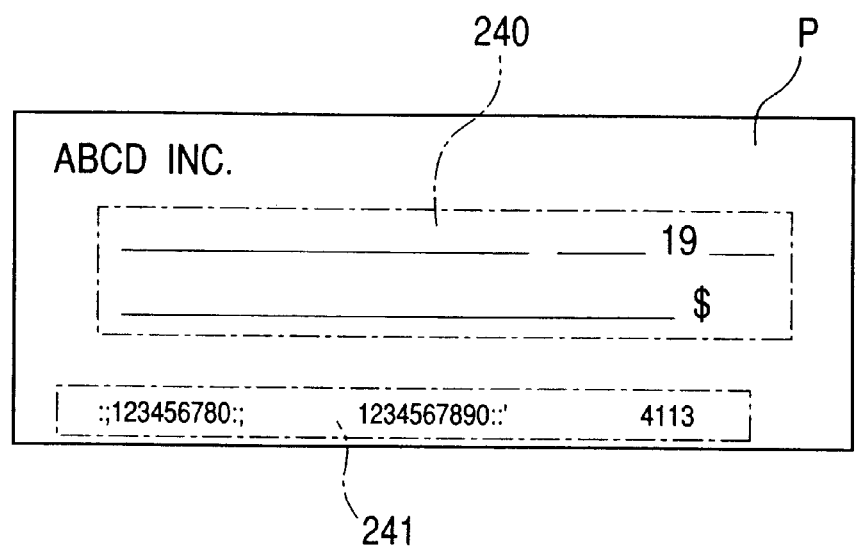
FIGS. 24(A) and 24(B) show a configuration of the front and back of a check.
Figure 24B:
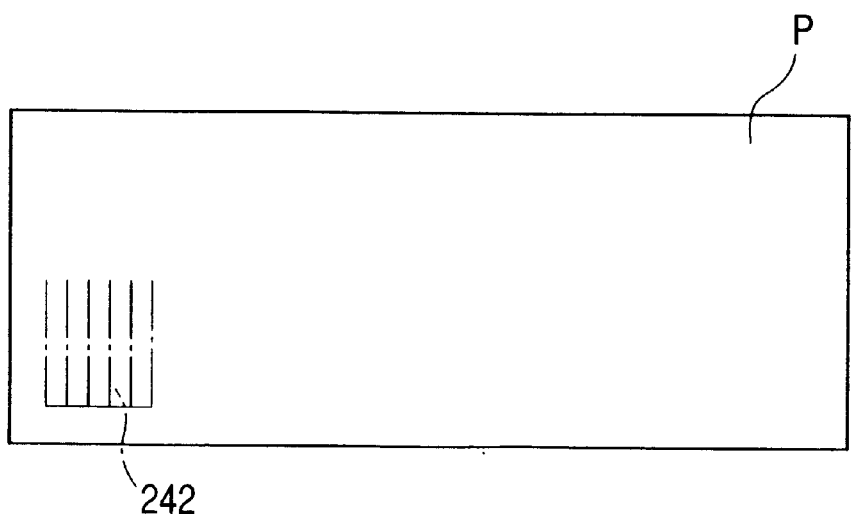

This operation inverts the side of check P so that it is passed again through transportation path 12 with the opposite (endorsement) side presented to the print head 17. When the endorsement area 242 on the check P back reaches the print head 17, the print head 17 prints the check endorsement information. (2306). When printing is completed, the check P is advanced to the ejection opening 11 as shown in FIG. 22, during which time an image of the check back is captured by the scanner 16 and stored (2307). After the image is captured the check P is advanced through transportation path 12 and ejected from the ejection opening 11 to outside the printer (2308). This completes check P processing.

Check processing by this embodiment circulates the check P only once through the printer. Processing time is thus shortened and throughput improved.

Print head 17 and magnetic head 18 are mounted on a common carriage and moved together in the described embodiments. These can be mounted on separate carriages and moved independently. The print head 17 is also used to print the check amount and payee, but can alternatively be used to print only the endorsement information.

Furthermore, the scanner 16, print head 17 and magnetic head 18 are disposed toward the insertion opening 10 in the above embodiments, but they can be provided further downstream or on the opposite side of the transportation path 12.

A series of processes on the front and back sides of a check or other print medium can be efficiently accomplished by device of the present invention without requiring operator intervention to reverse the print medium.

In addition, a printer capable of performing this process can be achieved in an extremely compact configuration.

A number of embodiments of the invention have been described. Nevertheless, it will be understood that various modifications may be made without departing from the spirit and scope of the invention. Accordingly, other embodiments are within the scope of the following claims.

What is claimed is:

1. A printer comprising:
   a transportation path having a print medium insertion opening and the ejection opening;
   a print medium transporter coupled to the transportion path, the print medium transporter adapted to move a print medium in a first orientation through the entire print medium path between the insertion opening and the ejection opening;
   an image reader disposed adjacent the transportation path and oriented to capture an image of the print medium;
   a printing mechanism disposed adjacent the transportation path and oriented to print on the print medium;
   a reverse feed mechanism disposed adjacent the transportation path upstream of the ejection opening and adapted to reverse feed the print medium in a second orientation opposite from the first orientation through the entire print medium path; and
   a return path connected to the reverse feed mechanism and to a portion of the transportation path upstream of the image reader.

2. A printer as described in claim 1, wherein the printing mechanism is disposed to the transportation path downstream of the image reader.

3. A printer as described in claim 1, wherein the printing mechanism is disposed to the transportation path upstream of the image reader.

4. A printer as described in claim 1, further comprising a path divider at a junction between the transportation path and return path, the path divider adapted to guide to the ejection opening a print medium advanced from the upstream side of the transportation path to the path junction, and adapted to guide to the return path a print medium reversed by the reverse feed mechanism from a downstream side of the transportation path to the path junction.

5. A printer as described in claim 4, wherein the path divider is a path switch rotatably shaft supported, oriented in a direction closing the transportation path at the path junction, and adapted to be opened by a force of a leading edge of a print medium advanced toward the ejection opening and contacting the path switch.

6. A printer as described in claim 1, wherein the print medium transporter comprises two drive side transport rollers disposed mutually separated, and a circulation path formed by the transportation path, the return path being disposed around the rollers.

7. A printer as described in claim 6, further comprising a third transport roller driven in forward and reverse directions and disposed to the transportation path upstream of the ejection opening, wherein the reverse feed mechanism is achieved by driving the third transport roller in reverse.

8. A printer as described in claim 7, further comprising a reversible motor;
   a first gear set that drives the third transport roller forward or reverse according to the direction of motor rotation; and a second gear set that drives the two transport rollers of the print medium transporter forward regardless of the direction of motor rotation.

9. A printer as described in claim 8, wherein the second gear set comprises:

two one-way clutches supported on a rotating shaft of one transport roller of the print medium transporter adapted to alternately transfer torque in the same direction of rotation to said transport roller;

a third gear set that transfers drive force from the motor during forward motor drive to the transport roller by way of one intervening one-way clutch; and a fourth gear set that transfers drive force from the motor during reverse motor drive to the transport roller by way of the other intervening one-way clutch.

10. A printer as described in claim 1, in which the printing mechanism comprises:

a print head; and a print head transport mechanism for moving the print head substantially orthogonal to the print medium transport direction.

11. A printer as described in claim 1, further comprising a magnetic ink character reader disposed adjacent the transportation path on a downstream side of the image reader.

12. A printer as described in claim 11, wherein the magnetic ink character reader comprises:

a magnetic head; and a magnetic head transport mechanism for moving the magnetic head substantially orthogonal to the print medium transport direction.

13. A printer as described in claim 12, wherein the printing mechanism comprises a print head and a print head transport mechanism for moving the print head substantially orthogonal to the print medium transport direction, and wherein the magnetic head transport mechanism is the print head transport mechanism.

14. A printer as described in claim 1, further comprising a character recognition mechanism adapted to detect magnetic ink characters on the print medium captured and stored by the image reader.

15. A printer as described in claim 1, further comprising a data capture mechanism adapted to obtain information relating to a print area of the print medium from the print medium image captured by the image reader, wherein the printing mechanism is controlled based on the captured data.

16. A printer as described in claim 1, further comprising a print medium length detector adjacent the transportation path; and a reverse feed controller adapted to prohibit reverse feed of the print medium by the reverse teed mechanism when the print medium length detected by the length detector is longer than a length of a circulation path formed by the transportation path and return path.

17. A printer as described in claim 1, wherein the print medium is a check.

18. A printer control method for processing a print medium including at least non-magnetic ink characters, the printer control method comprising:

reading an image of the print medium, including the non-magnetic ink characters, transported through a print medium transporter;

printing to a first side of the print medium by a single printing mechanism;

feeding the print medium to a return path by reversing the print medium transport direction by a reverse feed mechanism; and printing to a second side of the print medium by the single printing mechanism.

19. A control method as described in claim 18, further comprising:

feeding the print medium to the return path by reversing the print medium transport direction by the reverse feed mechanism;

capturing an image of the print medium during the print medium transportation by an image reader; and ejecting the print medium from an ejection opening.

20. A printer control method for processing a print medium including at least non-magnetic ink characters, the printer control method comprising:

printing to a first side of a print medium by a single printing mechanism;

reading an image of a printed first side of the print medium, including the non-magnetic ink characters;

feeding the print medium to a return path by reversing the print medium transport direction by a reverse feed mechanism;

printing to a second side of the print medium by the single printing mechanism; reading an image of the printed second side of the print medium; and ejecting the print medium from an ejection opening.

21. A printer control method comprising:

printing to a first side of a print medium by a printing mechanism;

reading an image of a printed first side of the print medium;

detecting by a length detector a length of the print medium guided to the transportation path; and ejecting the print medium from an ejection opening when the print medium length detected by the length detector is longer than a length of a circulation path formed by the transportation path and return path.

22. A printer comprising:

a transportation path for transporting a print medium from an insertion opening to an ejection opening, the transportation path having a print medium path between the insertion opening and the ejection opening;

transporting device for moving a print medium in a first orientation through the entire print medium path between the insertion opening and the ejection opening;

image reading device disposed adjacent the transportation path for capturing an image of a print medium transported in the transportation path;

printing means disposed adjacent the transportation path for printing to the print medium being transported through the transportation path;

reverse feeding device disposed adjacent the transportation path upstream of the ejection opening for reverse feeding the print medium in a second orientation opposite from the first orientation through the entire print medium path; and a return path for guiding a print medium reverse fed by the reverse feeding device to a position on the transportation path upstream of the image reading means.

23. A printer comprising:

a transportation path having an insertion opening on one end and an ejection opening on an other end and a medium path between the insertion opening and the ejection opening, the entire medium path being U-shaped;

a first roller disposed inside the U-shape at an intermediate part of the transportation path;

a second roller disposed inside the U-shape near the insertion opening to the transportation path; and a third roller disposed near the ejection opening for pulling a print medium out from the transportation path and then passing the print medium above the first roller for printing to or scanning a reverse side of a first side of the print medium after printing to or scanning the first side of a print medium transported in the transportation path.

24. A printer device as described in claim 23, in which the first roller and second roller always turn in a same direction, and the third roller turns in forward and reverse directions.

25. A control method as described in claim 18, wherein the reading step comprises reading an entire image of the print medium transported through the print medium transporter.

26. A control method as described in claim 20, wherein the reading step comprises reading an entire image of the print medium transported through the print medium transporter.

27. A control method as described in claim 18, wherein the print medium includes magnetic ink characters, and wherein the method further comprises reading the magnetic ink characters of the print medium.

28. A control method as described in claim 20, wherein the print medium includes magnetic ink characters, and wherein the method further comprises reading the magnetic ink characters of the print medium.

* * * * *